US010867317B2

(12) United States Patent
Ladds et al.

(10) Patent No.: US 10,867,317 B2
(45) Date of Patent: Dec. 15, 2020

(54) GENERATING RECOMMENDATIONS TO MAXIMIZE LOYALTY EARNINGS

(71) Applicant: MasterCard International Incorporated, Purchase, NY (US)

(72) Inventors: Anouska Ladds, Kent (GB); Heather Alice Cobb, London (GB); Simon Forbes, Oxon (GB); Piero Macari, Esher (GB)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 364 days.

(21) Appl. No.: 15/853,127

(22) Filed: Dec. 22, 2017

(65) Prior Publication Data

US 2019/0197575 A1    Jun. 27, 2019

(51) Int. Cl.
*G06Q 30/00* (2012.01)
*G06Q 30/02* (2012.01)
*G06Q 30/06* (2012.01)

(52) U.S. Cl.
CPC ..... *G06Q 30/0233* (2013.01); *G06Q 30/0226* (2013.01); *G06Q 30/0631* (2013.01)

(58) Field of Classification Search
CPC ...................... G06Q 30/0226; G06Q 30/0233
USPC ......................................................... 705/14
See application file for complete search history.

(56) References Cited

U.S. PATENT DOCUMENTS

| | | | | |
|---|---|---|---|---|
| 2008/0059303 | A1* | 3/2008 | Fordyce | G06Q 30/0239 705/14.27 |
| 2015/0161645 | A1* | 6/2015 | Unser | G06Q 30/0226 705/14.27 |
| 2016/0071140 | A1* | 3/2016 | Sherman | G06Q 30/0226 705/14.27 |
| 2016/0267517 | A1* | 9/2016 | Zachrisen | G06Q 30/0233 |

OTHER PUBLICATIONS

Shermach, Kelly, 2002, The Vibrant World of Loyalty: Their Creativity Levels are High, but so are the Hurdles as Banks and Retailers Roll Out New Loyalty Programs in an Effort to Counteract the Forces that take their Customers Away (Year: 2002).*

* cited by examiner

*Primary Examiner* — Matthew L Hamilton

(57) ABSTRACT

The disclosure facilitates loyalty earnings by generating purchase recommendations. Loyalty data is collected from a loyalty program data store. The loyalty data is associated with a loyalty profile of a user. Account data is collected from an account data store. The account data is associated with an account of the user that is linked to the loyalty profile of the user. Transaction data is collected from a transaction data store. The transaction data is associated with the account of the user. User recommendations are generated for prioritizing loyalty earnings on the loyalty profile based on the loyalty data, account data, and transaction data. After the recommendations are generated, the recommendations are caused to be displayed on a user interface associated with a computing device of the user. Combining the three types of collected data to generate the recommendations results in accurate recommendations that are tailored to the user to increase loyalty earnings.

20 Claims, 10 Drawing Sheets

GENERATING RECOMMENDATIONS TO MAXIMIZE LOYALTY EARNINGS

BACKGROUND

Modern computing devices, such as mobile phones and tablets, may be configured to run different types of applications, or apps, for a variety of purposes. Many companies offer apps to provide very specific sets of services to users. For instance, a travel-based company, such as an airline or hotel chain, may offer an app enabling users to monitor earned loyalty program points. Loyalty program monitoring apps of airlines, hotel chains, etc., may provide useful information about how many loyalty points a user has earned as well as a few other data points, but such apps are limited in the information and services that can be provided by the associated company. Due to these limitations regarding the information that loyalty program monitoring apps are able to provide, users may not have access to the information they need to make purchasing decisions based on loyalty point earnings.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A computerized method for generating purchase recommendations to maximize loyalty earnings is described. The method comprises collecting, by a loyalty management engine, loyalty data from a loyalty program data store, the loyalty data associated with a loyalty profile of a user; collecting, by the loyalty management engine, account data from an account data store, the account data associated with an account of the user that is linked to the loyalty profile of the user; and collecting, by the loyalty management engine, transaction data from a transaction data store, the transaction data associated with the account of the user. The loyalty management engine generates user recommendations for prioritizing loyalty earnings on the loyalty profile based on the loyalty data, account data, and transaction data. After the recommendations are generated, they are caused to be displayed on a user interface associated with a computing device of the user.

Many of the attendant features will be more readily appreciated as the same becomes better understood by reference to the following detailed description considered in connection with the accompanying drawings.

BRIEF DESCRIPTION OF THE DRAWINGS

The present description will be better understood from the following detailed description read in light of the accompanying drawings, wherein:

Corresponding reference characters indicate corresponding parts throughout the drawings. In FIGS. 1 to 6, the systems are illustrated as schematic drawings. The drawings may not be to scale.

DETAILED DESCRIPTION

The systems and methods described herein are configured to generate purchase recommendations to maximize loyalty earnings. Loyalty data associated with a loyalty profile of a user is collected from a loyalty program data store, account data associated with an account of the user is collected from an account data store, and transaction data associated with the account of the user is collected from a transaction data store. User recommendations are generated for prioritizing loyalty earnings on the loyalty profile based on the loyalty data, account data, and transaction data. After the recommendations are generated, they are caused to be displayed on a user interface associated with a computing device of the user.

Using the collected data from the three different data sources to generate user recommendations enhances the accuracy of the recommendations as well as the breadth of types of recommendations that may be generated to maximize loyalty earnings. Further, combining all three types of collected data for use by a single application improves the user experience by providing a comprehensive platform for monitoring loyalty point earnings, managing travel plans, setting loyalty goals, and making associated purchases. The described system improves the speed at which a user may make travel arrangements. Additionally, the described system improves the efficiency of the process of maximizing loyalty point earnings when making purchases.

Figure 1:
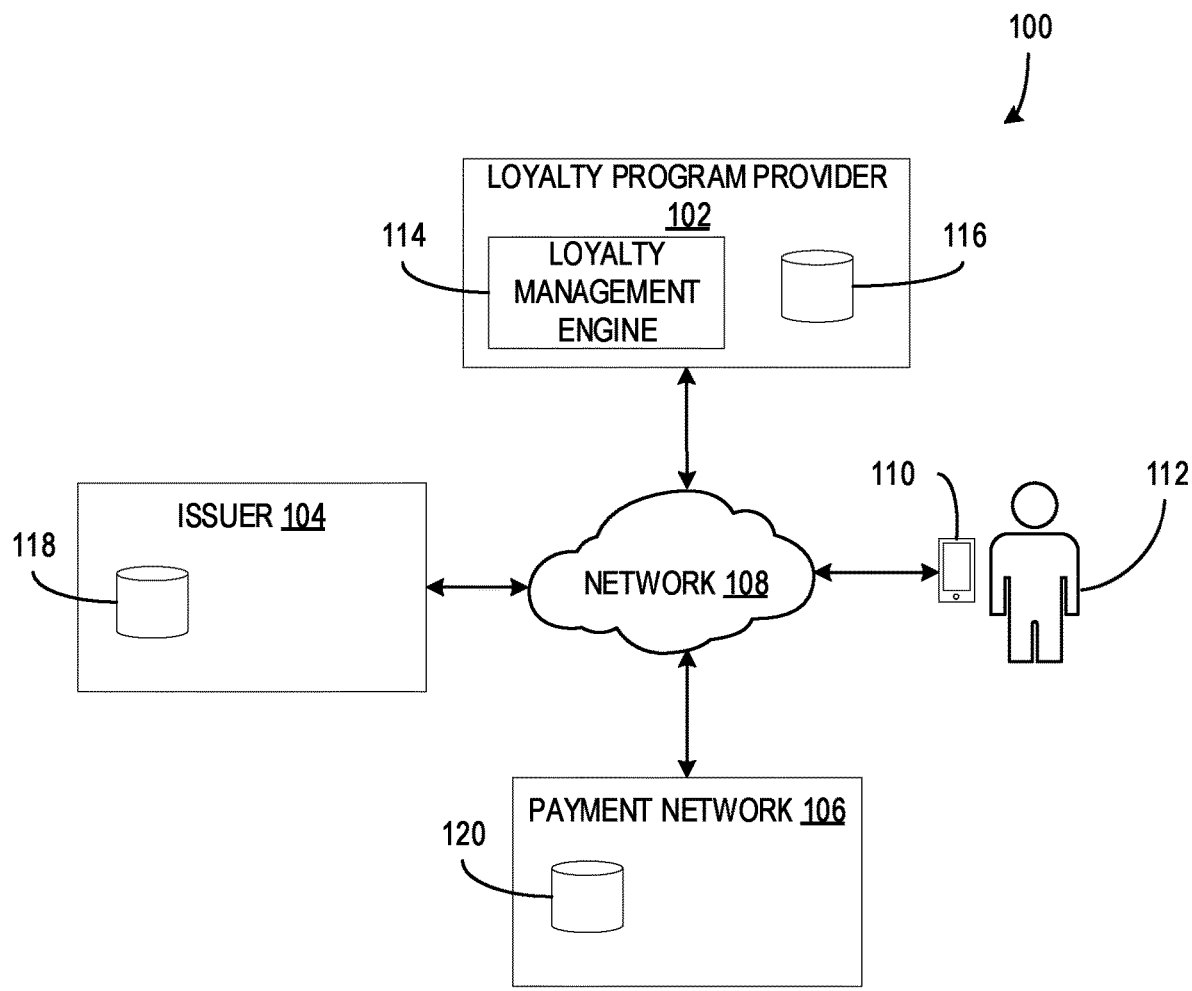
FIG. 1 is an exemplary block diagram illustrating a system configured for generating recommendations to maximize loyalty earnings based on loyalty data, account data, and transaction data according to an embodiment.

FIG. 1 is an exemplary block diagram illustrating a system 100 configured for generating recommendations to maximize loyalty earnings based on loyalty data, account data, and transaction data according to an embodiment. The system 100 includes a loyalty program provider 102, an issuer 104, and a payment network 106 connected to a network 108. Further, a computing device 110 of a user 112 is also connected to the network 108.

The loyalty program provider 102 (LPP) is a company or similar entity that hosts and/or manages a loyalty program (e.g., a frequent flyer miles program, a hotel-based loyalty rewards program, a supermarket or other store brand program, etc.). The LPP 102 may be associated with a brand name and/or other brand elements (e.g., logos, symbols, slogans, etc.) that enable users to recognize the LPP 102 upon observation. The LPP 102 includes at least one computing device, such as a server, that is configured to receive, store, process, and/or distribute data associated with the loyalty program. In some examples, the LPP 102 includes a plurality of servers and other associated computing devices distributed across multiple offices, buildings, other locations, etc. The one or more computing devices of the LPP 102 are configured to manage the loyalty program using a loyalty management engine 114 and store loyalty data in a loyalty program data store 116.

A loyalty management engine 114 is a software component that is run on one or more computing devices of the LPP 102. In some examples, the loyalty management engine 114 includes a processor configured to execute instructions to provide the functionality described herein. The loyalty management engine 114 is configured to receive loyalty data and other associated types of data from the loyalty program data store 116 and/or over a network connection (e.g., via network 108, etc.) from other entities (e.g., issuer 104, payment network 106, etc.), analyze or otherwise process the received data, and cause data to be sent and/or displayed to users of the loyalty program (e.g., displaying data to user 112 via computing device 110, etc.). The loyalty management engine 114 is described in greater detail below with respect to at least FIG. 2.

The loyalty program data store 116 stores loyalty data that may include loyalty profile data for a plurality of users of the loyalty program, account identifiers of accounts (e.g., bank accounts, credit accounts, other financial accounts, etc.) that are linked or otherwise associated with loyalty profiles of the plurality of users, loyalty points accrued by loyalty profiles, point reward data (e.g., point amounts or rates of point rewards associated with purchases or other transactions, bonus point amounts or rates associated with defined merchants or categories of purchases, etc.), point redemption data (e.g., goods or services that can be purchased through point redemption, point values required for redemption, etc.), etc.

The issuer 104 is an entity (e.g., a bank or other financial institution, etc.) that issues accounts that may be linked to the loyalty program of the LPP 102 through co-branding agreements. The accounts may be bank accounts, credit accounts, or other financial accounts. A user's (e.g., user 112, etc.) loyalty profile is associated with an account issued by the issuer 104, such that transactions made with the account may result in loyalty points being earned by the user's loyalty profile based on an associated co-branding agreement. For instance, user 112 may earn 1 loyalty point for each dollar spent using the user 112's account issued by issuer 104. Further, user 112 may earn 5 loyalty points for each dollar spent in transactions with the LPP 102 or an associated company. In this way, user 112 may be incentivized to make purchases from the LPP 102 in order to earn more loyalty points. The earned loyalty points may then be redeemed in exchange for products, services, funds deposited into the user's account, etc. Redemption rates for loyalty points may be defined such that redemption for goods or services provided by the LPP 102 or an associated company provides a greater value than other methods of redemption, further incentivizing the user to continue to do business with the LPP 102 and/or associated companies. Alternatively, the earned loyalty points may only be redeemable for goods or services provided by the LPP 102 or an associated company.

The issuer 104 includes an account data store 118 that stores account data associated with the accounts of users. The issuer 104 may also send account data from the account data store 118 to the LPP 102 for use by the loyalty management engine 114. The account data includes account identifiers, user identifiers, associated loyalty profile identifiers, account type, account amount, and the like. The account data may further include data associated with the loyalty program that is otherwise not stored and/or handled by the LPP 102. For instance, depending on the co-branding agreement between the LPP 102 and issuer 104, the account data store 118 may store some or all of the information defining rates for earning loyalty points based on purchases that are not made in association with the LPP 102 (e.g., when a user makes a purchase from an unrelated store using the co-brand account to earn loyalty points, that rate may be defined and/or managed by the issuer 104, etc.).

The payment network 106 (e.g., MASTERCARD, etc.) is a company or similar entity that facilitates transactions associated with accounts issued by the issuer 104. Through the facilitation of transactions, the payment network 106 records transaction data to a transaction data store 120. In some examples, the payment network 106 also sends transaction data from the transaction data store 120 to the LPP 102 for use by the loyalty management engine 114 as described herein. Transaction data stored by the payment network 106 in the transaction data store 120 may include, for instance, account identifiers for parties of the transactions, date/time data, location data of the transactions, transaction category data, etc.

The user 112 uses a computing device 110 to interact with the system 100, including the loyalty management engine 114. The computing device 110 may be a laptop, desktop computer, tablet, mobile phone, or the like. The computing device 110 may connect to the network 108 and thereby communicate and/or interact with the loyalty management engine 114 as described herein. A loyalty application associated with the loyalty management engine 114 may be installed and/or executed on the computing device 110, configuring the computing device 110 to communicate with the loyalty management engine 114 via application program interfaces (APIs) and/or interact with the user 112 via user interfaces such as graphical user interfaces (GUIs), speakers, buttons, switches, touch screens, and/or other types of user interfaces as known in the art. The loyalty application and associated interfaces are described in greater detail below.

It should be understood that network 108 may include one or more integrated or otherwise connected networks. The network 108 may include public and/or private networks, large-scale networks, such as the Internet, and/or relatively smaller intranets. The network 108 may be accessed via wired and/or wireless connections, using any and all network protocols as understood by a person of ordinary skill in the art.

While the loyalty management engine 114 is shown as being part of the LPP 102, in alternative examples, the loyalty management engine 114 may instead by implemented on another entity of the system, such as a computing device of the issuer 104, a computing device of the payment network 106, the user's computing device 110, or a combination thereof. In other examples, the loyalty management 114 may be implemented on a computing device separate from the entities shown in system 100.

Figure 2:
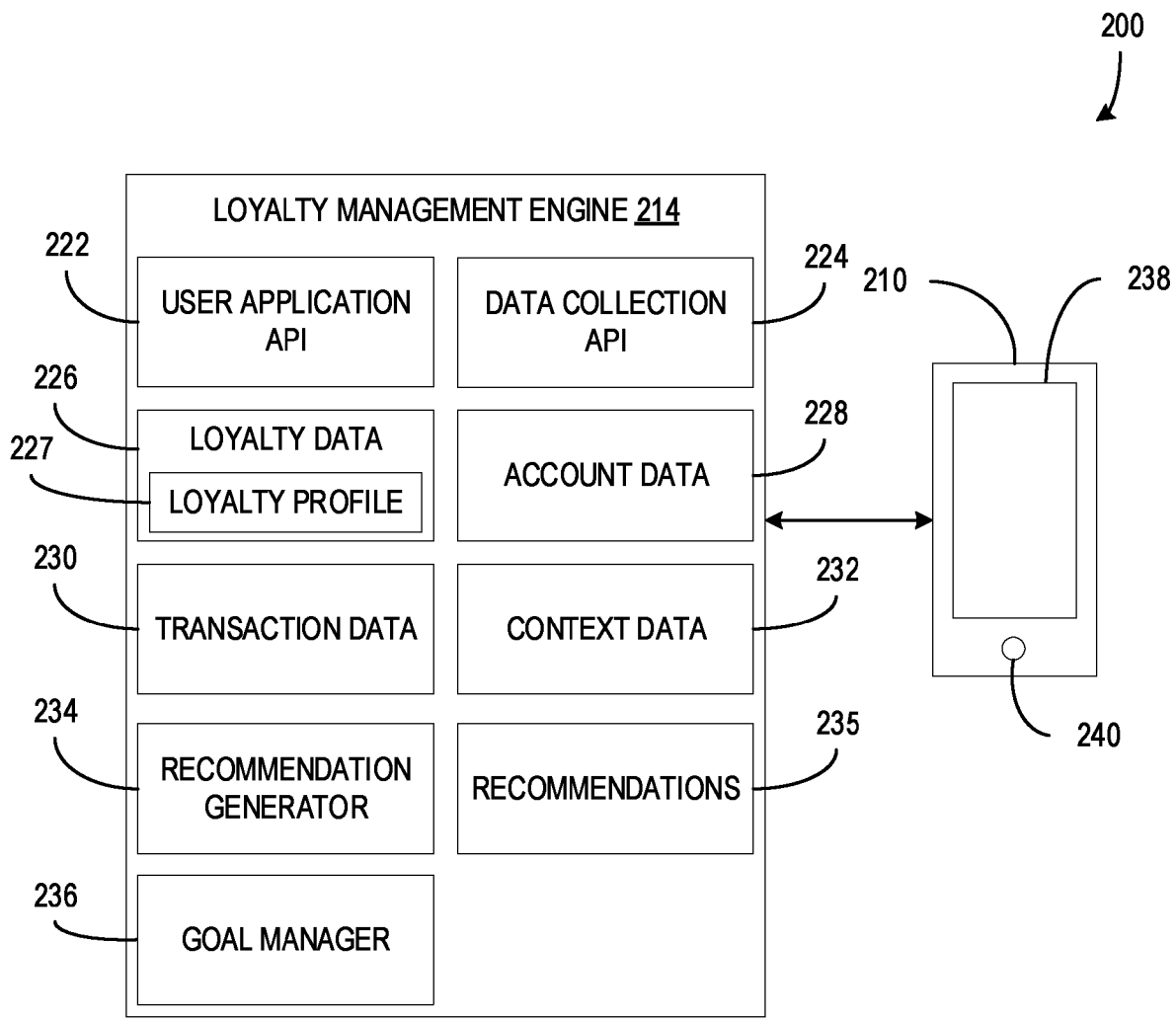
FIG. 2 is an exemplary block diagram illustrating a loyalty management engine and an associated computing device according to an embodiment.

FIG. 2 is an exemplary block diagram 200 illustrating a loyalty management engine 214 and an associated computing device 210 according to an embodiment. In some examples, the loyalty management engine 214 includes a processor configured to execute instructions to provide the functionality described herein. The loyalty management engine 214 includes a user application API 222, a data collection API 224, loyalty data 226, account data 228, transaction data 230, context data 232, a recommendation generator 234, and a goal manager 236.

The user application API 222 includes one or more software interfaces that are configured to enable a user or application program to access and use the functionality of the loyalty management engine 214. The user application API 222 may be linked to a user application that may be installed and/or executed on computing device 210 or another computing device. In some examples, the user application API 222 provides interfaces that enable a user to access loyalty data 226, account data 228, transaction data 230, and/or generated recommendations 235. Further, the user application API 222 may enable a user configure settings and/or features of a loyalty profile 227 and/or an associated loyalty program application, etc.

The data collection API 224 includes one or more software interfaces that are configured to access data stores (e.g., data stores 116, 118, and 120, etc.) and collect data (e.g., loyalty data 226, account data 228, transaction data 230, etc.) from the accessed stores. Further, the data collection API 224 may include a software interface for collecting context data 232 from a user's computing device 210 or other computing device. In some examples, the data collection API 224 includes access information for an associated loyalty program provider (e.g., loyalty program provider 102, etc.), an associated issuer (e.g., issuer 104, etc.), and/or an associated payment network (e.g. payment network 106, etc.). The data collection API 224 may enable the loyalty management engine 214 to request and receive data from data stores as described herein.

The loyalty data 226 includes data associated with a loyalty program of a loyalty program provider (e.g., loyalty program provider 102, etc.). This may include types of purchases or specific item or service purchases that earn loyalty points in the loyalty program, items and/or services that may be purchased through redeeming loyalty points, rules regarding earning and/or redeeming points in the loyalty program including special rates for earning and/or redeeming points, loyalty profile data 227 associated with specific users of the loyalty program, such as loyalty point balances, travel history with the loyalty program, upcoming travel plans with the loyalty program (e.g., hotel booking information, flight information, etc.), etc. In some examples, the loyalty data 226 is obtained from a loyalty program data store (e.g., loyalty program data store 116, etc.) of an associated LPP (e.g., LPP 102, etc.), but in other examples, the loyalty data 226 may be obtained from more than one data stores and/or other types of data stores.

The account data 228 includes data associated with accounts linked to a loyalty program. The account data 228 is collected primarily from an account data store (e.g., account data store 118, etc.) of an issuer of the accounts (e.g., issuer 104, etc.), but it may also be collected from other sources in some examples. It may include account numbers or other types of account identifiers, loyalty profile identifiers for loyalty profiles 227 linked to accounts, and other account data, such as an account balance, an account balance limit, account-specific rules, account history data, etc. as well as loyalty program data associated with the accounts that may not be stored and/or managed by an LPP (e.g., LPP 102, etc.).

The transaction data 230 includes transactions associated with the accounts described herein. Transaction data 230 includes transaction amount values, transaction date and time, parties to the transactions, transaction type, etc. The transaction data 230 may be collected from a transaction data store (e.g., transaction data store 120, etc.) at a payment network (e.g., payment network 106, etc.). Alternatively, or additionally, the transaction data 230 may be collected from other associated entities, such as issuers, banks, or the like.

Context data 232 includes data describing the context of a user and/or an associated profile (e.g., loyalty profile 227, etc.) when interacting with the loyalty management engine 214. The context data 232 may include a date/time and/or location of a user. Further, the context data 232 may include specific keywords, categories, or limitations provided by the user for filtering or otherwise focusing recommendations 235 provided by the loyalty management engine 214. The context data 232 may be collected via the data collection API 242 from the computing device 210. For instance, the computing device 210 may be configured to obtain global positioning system (GPS) data or cellular triangulation data as location data associated with the user of the computing device 210 and provide the location data to the loyalty management engine 214. Further, the user of the computing device 210 may select a particular category of restaurant (e.g., seafood restaurants, etc.) and the selected category may be sent from the computing device 210 to the loyalty management engine 214 for use by the recommendation generator 234 as described herein. Alternatively, or additionally, context data 232 may be collected from other sources, such as a computing device upon which the loyalty management engine 214 is executed (e.g., a current date and/or time may be obtained from the computing device of the loyalty management engine 214 and adjusted for the user's time zone based on location data received from the user's computing device 210, etc.).

The recommendation generator 234 is a component of the loyalty management engine 214 configured to generate user recommendations (e.g., recommendations 235, etc.) for specific users based on associated collected data (e.g., loyalty data 226, account data 228, transaction data 230, context data 232, etc.). In some examples, the recommendation generator 234 includes a processor configured to execute instructions to generate recommendations 235 as described herein. The recommendation generator 234 may analyze the collected data based on defined recommendation rules and/or associated algorithms in order to generate one or more recommendations 235 of purchases, shopping locations, etc. for a user (e.g., user 112, etc.). Recommendations 235 may indicate that the user should make the recommended purchases, shop at the recommended locations, etc. using an account linked to the associated loyalty program to maximize loyalty point earnings. In some examples, maximizing loyalty point earnings include recommending purchases that yield greater loyalty point earnings and/or earnings rates than other similar purchases, recommending merchants, shopping locations, or purchases that yield increased loyalty point earnings over a user's typical purchasing behavior, etc. Maximizing loyalty point earnings may further include enhancing loyalty point earnings, increasing loyalty point earnings, boost loyalty point earnings, amplify loyalty point earnings, etc.

Alternatively, or additionally, recommendations 235 may include redemption recommendations of purchases to be made through efficient redemption of earned loyalty points. The redemption recommendations may be generated by the recommendation generator 234 in such a way that loyalty points spent are reduced or minimized for each purchase of goods or services. Other recommendation factors may also be used to generate redemption recommendations as described herein with respect to other recommendations 235.

The recommendation generator 234 may analyze the various types of collected data alone or in combination to generate recommendations 235 of purchases and/or goals that a user is likely to want. In some examples, the recommendation generator 234 analyzes loyalty data 226, account data 228, and transaction data 230 to generate accurate recommendations 235 for maximizing loyalty point earnings focused on the associated user. For instance, the recommendation generator 234 may identify a transaction behavior pattern indicating that the user frequently goes to the movies. After identifying several movie theaters that the user may want to try (e.g., based on the locations of theaters the user has frequented in the past derived from the transaction data 230, based on a destination of a future travel plan derived from the loyalty data 226, etc.) the recommendation generator 234 analyzes loyalty data 226 to determine which movie theater may provide the best loyalty point earning opportunity (e.g., one of the theaters may have an increased loyalty point earning rate due to an arrangement with the LPP or an associated co-brand account issuer, etc.). A recommendation 235 based on the analysis is generated indicating that the user should go to the movie theater that provides the best loyalty point earnings.

The collected data (e.g., loyalty data 226, account data 228, and transaction data 230, etc.) may be transformed by the recommendation generator 234 during the process of generating recommendations 235. For instance, loyalty data 226 that indicates a type of purchase (e.g., travel-related purchases, grocery store purchases, gas station purchases, online merchant purchases, etc.) that yields an increased rate of loyalty earnings may be combined with transaction data 230 that includes transactions associated with the indicated type of purchase. The combined data may be used to generate recommendations that include purchases of the indicated type from merchants and/or specific purchase locations the user has made purchases from in the past based on transaction data 230.

In particular, the loyalty data 226 (e.g., features of the loyalty program and/or user's loyalty profile 227 (e.g., offers to earn loyalty points and/or earn loyalty points at an increased rate based on types of purchases, purchases from specific merchants or types of merchants, etc.), past loyalty point redemption purchases, travel plans made in association with the user's loyalty profile 227, etc.) may be compared against a set of available recommendation options (e.g., potential shopping locations, potential online merchants, potential purchases, etc.) and those options that are similar (or most similar) to the loyalty data 226 may be selected as recommendations 235 to the user. For instance, if the user redeemed loyalty points to pay for a spa treatment when on a previous vacation associated with the loyalty program provider or an associated travel company, and a current travel plan indicates that the user is going to a resort that offers similar spa treatments that can be purchased by using the user's loyalty program-linked account to earn loyalty points at an increased rate, the recommendation generator 234 may generate a recommendation for the user to visit one or more particular spas at the resort to which the user is currently traveling. Further, the spa recommendation(s) may be generated in such a way that the spa that results in the most earned loyalty points per amount spent is prioritized over other spa options.

Account data 228 and transaction data 230 may be used by the recommendation generator 234 to further identify and generate recommendations 235 for the user. Account data and associated past transactions may be used by the recommendation generator 234 to identify past transaction behavior patterns of the user and generate recommendations 235 that conform to the identified behavior patterns within a recommendation threshold. Transaction behavior patterns may include the user's tendency to shop at certain types of stores or at particular brands of stores, the user's tendency to purchase certain types of goods or services or particular brands of goods or services, the user's preference regarding time of day that purchases are made, types of restaurant cuisines that the user prefers, etc. The transaction behavior patterns identified from the account data 228 and transaction data 230 include information about the user's behavior that may not otherwise be available to the loyalty program provider, enhancing the potential accuracy of the recommendations 235 generated therefrom.

For instance, a user's past transaction data may indicate that the user prefers to eat at Chinese restaurants or Thai restaurants. The recommendation generator 234 applies the identified transaction behavior pattern to recommendations 235 generated for the user such that, when restaurant recommendations are provided to the user, they include Chinese and/or Thai restaurant recommendations. Further, the Chinese and/or Thai recommendations may be prioritized for the user (e.g., the recommendations may appear at the top of a list of recommendations, the recommendations may be highlighted, etc.). Alternatively, or additionally, the user's past transaction data may indicate that the user prefers going to the movies over going to see live theater performances. When the user is on vacation and seeking entertainment in an unfamiliar location, the recommendation generator 234 may generate recommendations 235 that prioritize movie theaters over live theater performances.

In an alternative example, the recommendation generator 234 determines that the user is near three different attractions based on a current travel plan derived from the loyalty data 226. The user's interest in the attractions may be determined based on patterns in transaction data 230. The recommendation generator 234 may generate recommendations 235 for each attraction in a priority order based on the potential loyalty point earnings at each attraction. Secondary factors that may affect the priority order may include cost of the attraction, distance to the attraction, proximity of the attraction to other recommended places, etc.

Recommendations 235 generated by the recommendation generator 234 may be based on analysis of past transactions and identifying purchasing behavior where more loyalty points could have been earned had the user made different purchasing decisions. For instance, screen region 358 of FIG. 3B below shows a coffee shop recommendation that provides an alternative coffee shop to one that the user has already visited. The recommendation indicates that the user missed out on loyalty points and would have earned 50% more loyalty points for purchases at the recommended coffee shop instead of the coffee shop the user visited. Based on the recommendation, the user may decide to visit the recommended coffee shop next time.

The context data 232 may also be applied during recommendation generation. Location data may be used to identify potential locations to recommend based on the user's proximity thereto. Date and/or time data may be used to determine open hours of stores or restaurants, show times for movies or other scheduled events, time intervals associated with active sales or loyalty point earning bonuses that apply during particular times, etc. Date and/or time data may also be used in conjunction with a user's travel plan (e.g., in the loyalty data 226, etc.) to determine nearby attractions, stores, or restaurants that are potential recommendations when the user is traveling.

In some examples, the recommendations 235 generated by the recommendation generator 234 are sent to the user's computing device 210 and displayed on the interface 238 or otherwise provided to the user. The recommendations 235 may include a title or name of the recommended product, location, or service. Further, the recommendations 235 may include a cost in loyalty points and/or another currency (e.g., dollars, etc.), a distance and/or direction when the recommendation includes a location, and/or a description of the recommended product, location, or service. The user may select recommendations 235 via an interface (e.g., a touch screen component of interface 238, etc.) for purchase, to access additional information about the recommendation, and/or to convert the recommendation into a goal as described below.

The loyalty management engine 214 may collect data and/or cause the recommendation generator 234 to generate recommendations 235 at defined intervals (e.g., every 30 minutes, every 2 hours, every 6 hours, etc.) and/or based on events (e.g., user requests, detected movement to a new location, establishing a network connection, etc.). For instance, the loyalty management engine 214 may collect data from the data stores described herein every 30 minutes and the recommendation generator 234 may analyze the newly collected data to generate recommendations 235. Alternatively, or additionally, the loyalty management engine 214 may collect data and generate recommendations 235 based on an event, such as a request from a user for recommendations.

In some examples, the loyalty management engine 214 and/or the recommendation generator may be configured to generate a defined number of recommendations (e.g., one recommendation, three recommendations, ten recommendations, etc.). The recommendation generator 234 may generate more than the defined number in a priority order as described herein and then eliminate or otherwise hide, from the user, any recommendations that exceed the defined recommendation number. The user may be enabled to configure the loyalty management engine 214 to adjust the number of recommendations shown and to request additional recommendations from the loyalty management engine 214 after the defined number have been provided.

The loyalty management engine 214 may further include a goal manager 236, which is a component of the loyalty management engine 214 configured to store, update and/or otherwise manage loyalty goal data associated with users' loyalty profiles 227. In some examples, the goal manager 236 includes a processor configured to execute instructions to manage loyalty goals as described herein. Loyalty goals may be based on loyalty data 226 in combination with other data (e.g., transaction data 230, etc.). A user with a loyalty profile 227 may define goals that include loyalty point amount goals and/or specific goods or services that the user would like to purchase through loyalty point redemption. For instance, a user may have a loyalty goal of 10,000 loyalty points and/or a loyalty goal of obtaining 20,000 loyalty points to redeem for an airline flight to a particular destination city. Loyalty goals may be specific to travel (e.g., flights, flight upgrades, hotel stays, resort services, etc.) or they may be for other purchases, such as purchases from online shopping websites, stores, and/or restaurants associated with the loyalty program provider (e.g., LPP 102, etc.). In some examples, the loyalty goals may be directed a loyalty point redemption in the form of a direct credit to an account associated with the user's loyalty profile 227 (e.g., "cash back", etc.).

The goal manager 236 enables users to create loyalty goals associated with their loyalty profiles 227. A user may specify a loyalty point amount for a goal or select a specific goal from a set of potential goals that may be provided by the loyalty management engine 214. In some examples, recommendations 235 from the recommendation generator 234 may be converted into goals for use by the goal manager 236 based on selection input from the user. For instance, upon a list of recommendations 235 being provided to the computing device 210 and displayed to the user on an interface 238, the user may select one or more of the displayed recommendations 235 and choose to create goals based on the selections. Rather than providing the user a purchase interface for the selected recommendation(s), the user may be provided a goal creation interface enabling the user to complete the configuration of the created goals and confirm their creation. The created goals may then be sent to the goal manager 236 for storage and/or management.

The goal manager 236 accesses loyalty data 226 associated with a user's loyalty profile 227 to track progress toward the user's goals. For instance, the earned loyalty point balance of the user's profile may be accessed and/or monitored and compared against the loyalty point values the user's goals. When the user's earned loyalty point balance meets or exceeds the loyalty point value of one or more of the user's goals, the goal manager 236 may cause a notification to be sent to the user on the computing device 210 (e.g., an email message, a text message, an application-based notification, etc.). Further, the user may be prompted to make a purchase of goods or services associated with the goal that has been met. The user may confirm the purchase to initiate the transaction, cancel the purchase, or put the purchase on hold so that it may be revisited at a later time. In some examples, a user's loyalty goals are general goals not associated with particular purchases. When the user's earned loyalty point balance meets or exceeds a general loyalty goal, a notification may be sent but a purchase or transaction may not be suggested to the user. The user may be further prompted to remove the met goal from the user's loyalty profile 227 and/or to create a new goal to replace the met goal.

In some examples, the goal manager 236 enables a user to edit and/or remove a goal associated with the user's loyalty profile 227. Editing a goal may include changing the loyalty point amount of the goal and/or the associated goods or services for purchase associated with the goal. Removal of a goal removes it from the user's loyalty profile 227.

Further, the goal manager 236 may enable the user to monitor a percentage of completion of a goal based on the user's current loyalty point balance, a rate of progress toward a goal over a time interval (e.g., an amount of loyalty points earned over the past three months, a number of percentage points toward the goal earned over the past six months, etc.), and/or an estimated time to complete the goal based on the calculated rate of progress and an associated loyalty point requirement of the goal (e.g., at a current rate of 1,000 loyalty points per month, the user will complete the goal in three months, etc.). One or more of these values may be provided to the user via the interface 238 of the computing device 210, as described below. Additionally, the goal manager 236 may use recommendations 235 generated by the recommendation generator 234 to provide further goal completion prediction information. For instance, the goal manager 236 may provide a number of recommended purchases or a time period of typical recommended purchase behavior required to complete a selected goal (e.g., "You'll complete your goal if you visit coffee shop A five more times!", or "6 more months of your typical spending on Hotel B stays and your goal will be complete!", etc.).

In some examples, the loyalty management engine 214, in conjunction with a loyalty application on a computing device as described herein, may provide additional features, such as travel alerts based on travel plans associated with a user's loyalty profile and/or account, spending alerts based on a per-transaction threshold and/or a threshold over time, installment payment arrangements for purchases using an account and/or redeemed loyalty points, credit card payment and/or balance transfer functionality, etc.

The computing device 210 includes the user interfaces 238 and 240. The user interface 238 may include a screen for displaying information to a user of the computing device 210. Further, the user interface 238 may further include a touchscreen component that enables the user to provide input to the computing device 210 by contacting user interface 238 at various regions. The interface 240 includes a button that enables the user to provide confirmation input and/or other input to the computing device 210. The interface 240 may further include sensors (e.g., a contact sensor, a fingerprint sensor, etc.) for collecting other data. In some examples, the computing device 210 may further include other interfaces (e.g., network interfaces, GPS interfaces, etc.), sensors (e.g., accelerometers, other motion sensors, etc.), and other components that may generally be included in computing devices as understood by a person of ordinary skill in the art.

FIGS. 3A-3E are exemplary diagrams illustrating graphical user interfaces (GUIs) associated with a loyalty management engine displayed on a screen interface 338 of a computing device 310 according to an embodiment. A touchscreen interface of screen interface 338 and/or button interface 340 may be used to interact with the GUIs. In some examples, the exemplary GUIs may be associated with an application executing on the computing device 310 that is linked to and/or in communication with the loyalty management engine (e.g., loyalty management engine 214, etc.), which may be disposed on one or more computing devices separate from the computing device 310 as described herein. Alternatively, some or all of the loyalty management engine may be disposed on and/or executed by the computing device 310.

Figure 3A:
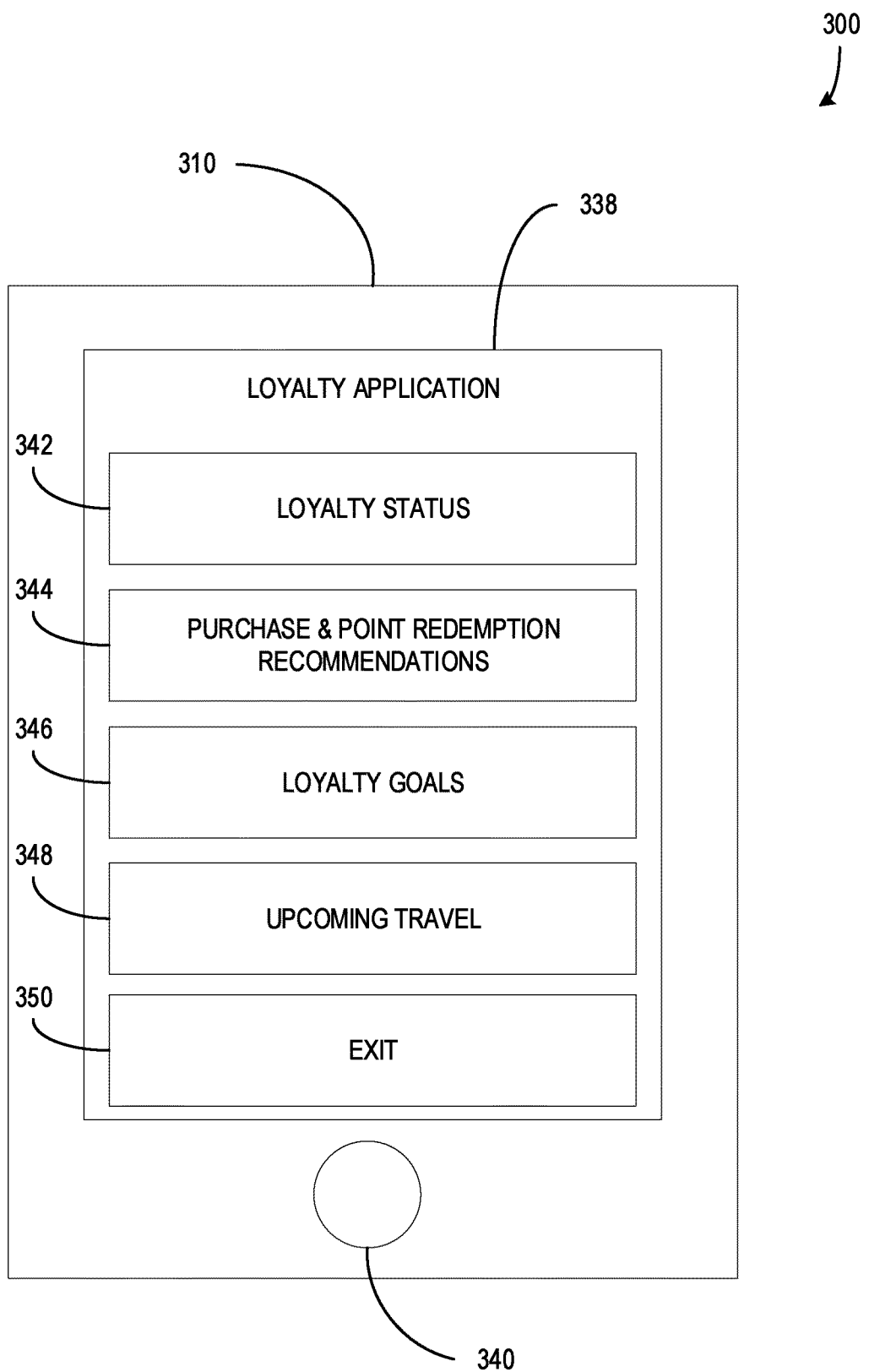
FIGS. 3A-3E are exemplary diagrams illustrating graphical user interfaces associated with a loyalty management engine displayed on a screen of a computing device according to an embodiment.

The GUI on the interface 338 in FIG. 3A includes touch-screen button interfaces 342-350. The loyalty status button 342, when pressed or otherwise activated, causes the loyalty application to load and display a loyalty status screen (e.g., FIG. 3B, etc.), the purchase and point redemption recommendations button 344, when pressed or otherwise activated, causes the loyalty application to load and display a recommendation screen (e.g. FIG. 3C, etc.). The loyalty goals button 346, when pressed or otherwise activated, causes the loyalty application to load and display a loyalty goals screen (e.g., FIG. 3D, etc.). The upcoming travel button 348, when pressed or otherwise activated, causes the loyalty application to load and display an upcoming travel screen (e.g., FIG. 3E, etc.). The exit button 350, when pressed or activated, causes the loyalty application to exit, causing the computing device 310 to revert to another application, default screen, or the like.

Figure 3B:
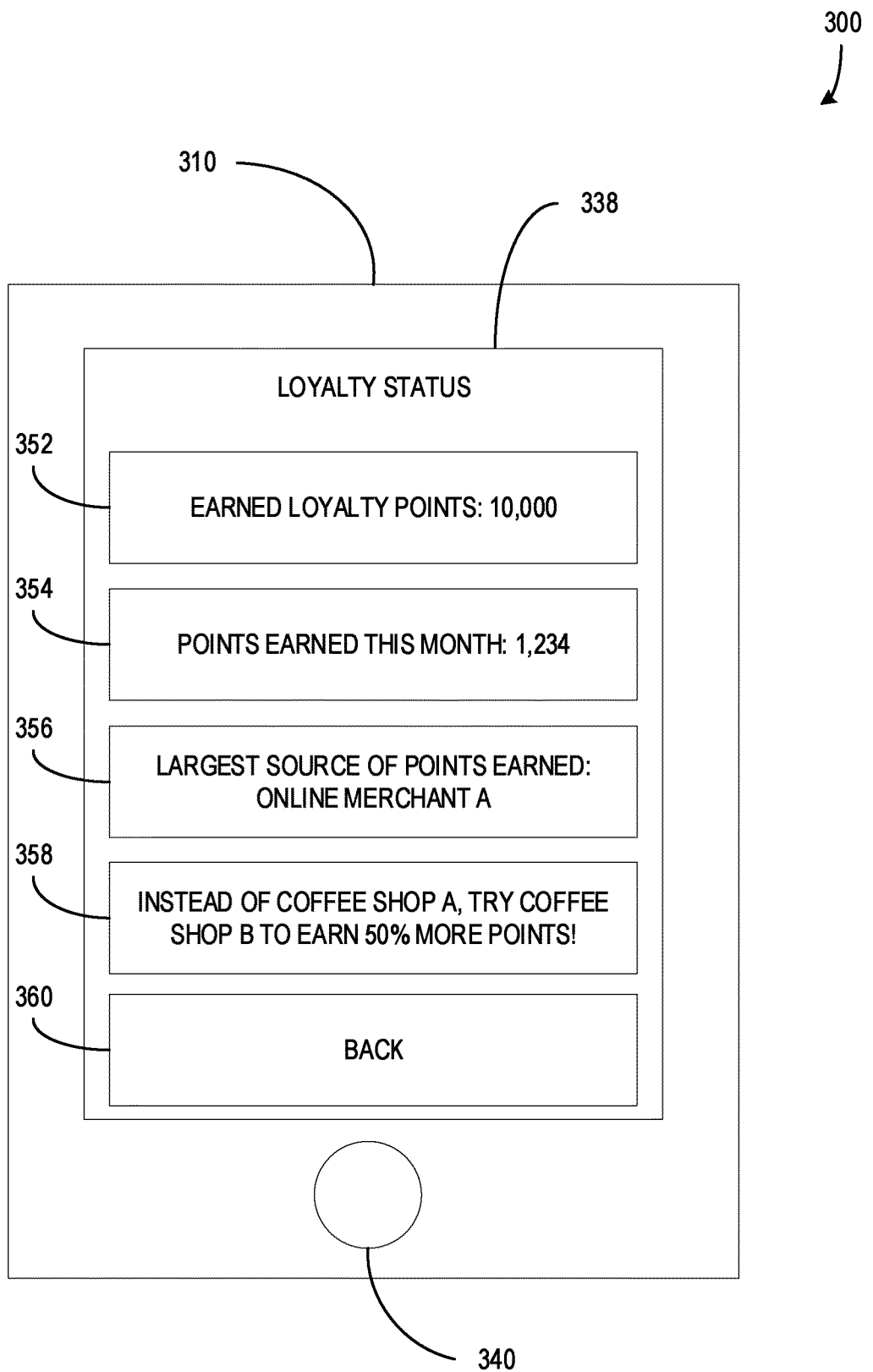

In FIG. 3B, an exemplary loyalty status screen is shown on the screen interface 338 of the computing device 310. The user's currently earned loyalty points are displayed in the screen region 352. A rate of earning points is displayed in the screen region 354. In this case, the displayed rate is points earned in the current month, but in other examples, other rates and/or statistics relating to the earned loyalty points of the user (e.g., points earned over the past three months, etc.) may be displayed. Further, a largest source of earned loyalty points is displayed in the screen region 356.

A recommendation (e.g., a recommendation 235 generated by a recommendation generator 234, etc.) is displayed in the screen region 358. The recommendation is an alternative recommendation that accounts for the user's past behavior of making purchases at coffee shop A as well as the increased rate at which loyalty points may be earned by purchases at coffee shop B. In some examples, alternative recommendations and/or other types of recommendations as described herein may be displayed in the loyalty status GUI. A back-button interface 360, when pressed or otherwise activated, causes the loyalty application to load and display the main loyalty application screen (e.g., FIG. 3A, etc.).

Figure 3C:
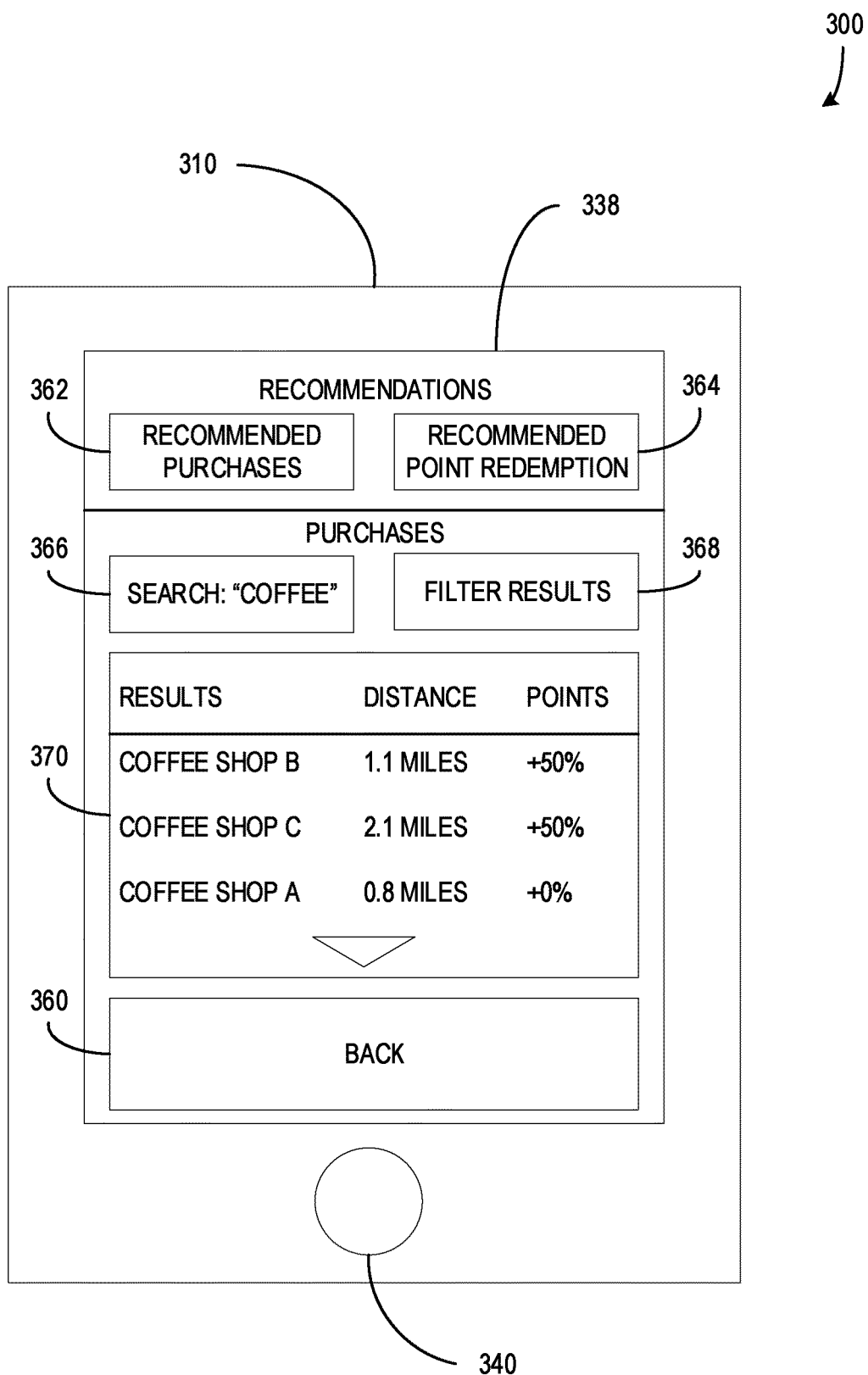

In FIG. 3C, an exemplary recommendation screen is shown on the screen interface 338 of the computing device 310. The recommendation screen includes a recommended purchases button 362 and a recommended point redemption button 364. The recommended purchases button 362, when pressed or otherwise activated, may cause the recommendation screen to load and display purchase recommendations (e.g., recommendations generated by a recommendation generator 234, etc.) for purchases that the user of the computing device may want to make, wherein earning loyalty points through the purchase recommendations is maximized. Alternatively, when the recommended point redemption button 364 is pressed or otherwise activated, the recommendation screen may load and display loyalty point redemption recommendations, wherein efficient use of the user's loyalty points may be maximized.

The recommendation screen further includes a filter entry interface 366, a filter results button 368, and a recommendation results section 370. A user may enter keywords into the filter entry interface 366 and, when the filter results button 368 is pressed or otherwise activated, the results in the results section 370 may be filtered based on the entered keywords. For instance, the user has entered the keyword "coffee" in the filter entry interface 366. As a result, the results section 370 displays a list of coffee shops. The results section 370 may display results in an order based on a recommendation priority as described above. For instance, coffee shop B is shown at the top of the list based on both on a loyalty point earning rate (+50% bonus rate) and travel distance (1.1 miles). Coffee shop C has the same point earning rate, but is farther away, so it is shown second on the list. Coffee shop A is closer than coffee shop B and coffee shop C, but it does not have a bonus point earning rate, so it is shown last on the list. In other examples, other factors may affect the order of the recommendations as described herein. The back-button 360, when pressed or otherwise activated, causes the loyalty application to return to the main loyalty application screen (e.g., FIG. 3A, etc.).

Figure 3D:
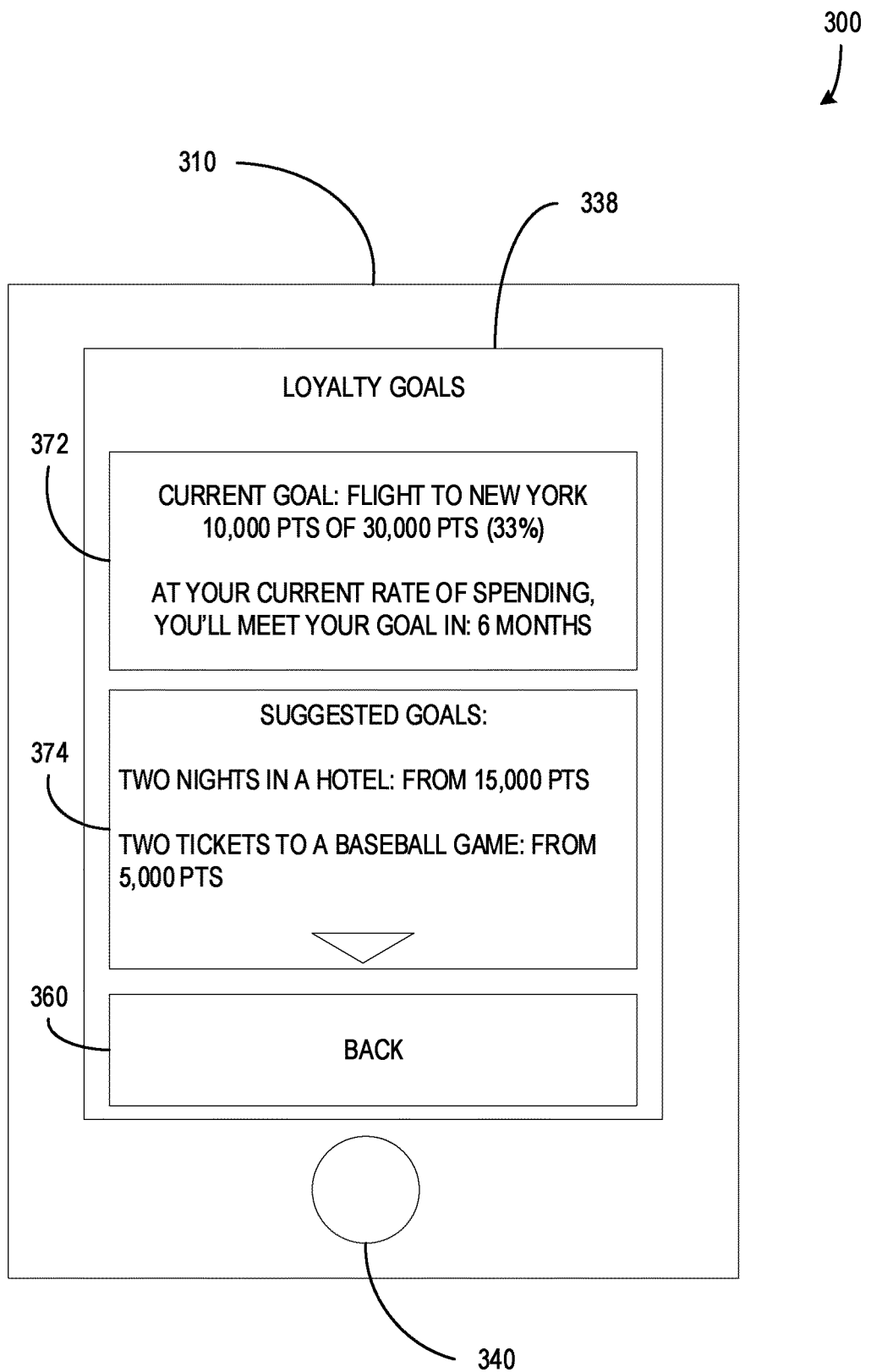

In FIG. 3D, a loyalty goal screen is displayed on the screen interface 338 of the computing device 310. A current goal section 372 displays a current loyalty points goal of the user of the computing device 310 as well as data associated with the current goal. For instance, the section 372 includes a current total of earned loyalty points toward the goal (e.g., 10,000 points of 30,000 points, etc.), a percentage of earned loyalty points of the required loyalty points to meet the goal (e.g., 33%, etc.), and an estimated time to complete the goal (e.g., 6 months, etc.). In some examples, more than one goal may be displayed and/or more, less, or different goal data may be displayed.

A suggested goal section 374 displays several suggested goals that may be derived from recommendations generated by a recommendation generator (e.g., recommendation generator 234, etc.). The suggested goals may be based on the user's location, purchasing behavior, travel plans, etc. as described herein with respect to generating recommendations. In this case, the suggested goals include a two-night stay in a hotel for 15,000 loyalty points and two tickets to a baseball game for 5,000 loyalty points. These suggested goals may be based on the user's current goal of a flight to New York (e.g., the suggested hotel stay and baseball game may be in New York, etc.). The back-button 360, when pressed or otherwise activated, causes the loyalty application to return to the main loyalty application screen (e.g., FIG. 3A, etc.).

Figure 3E:
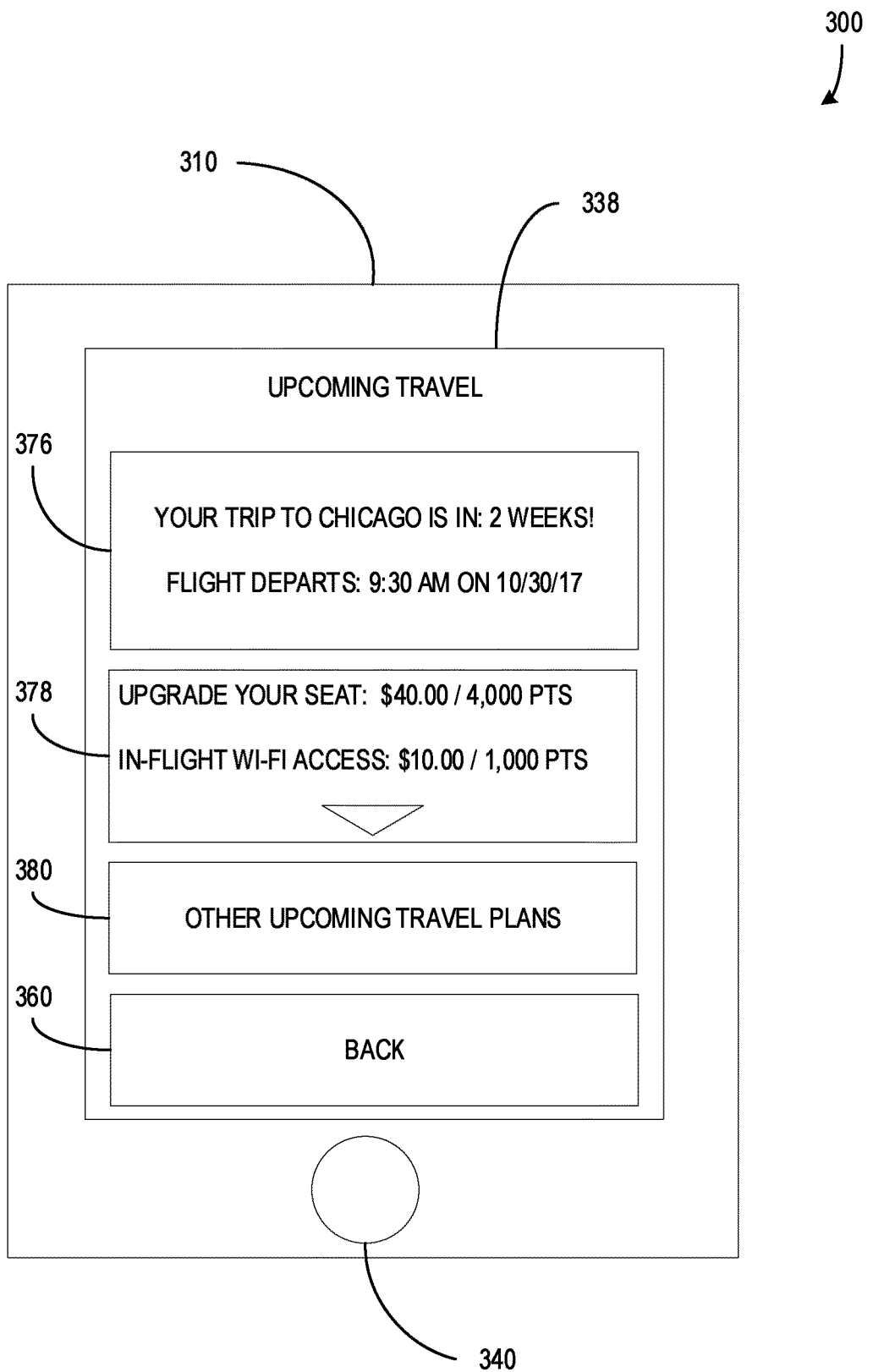

In FIG. 3E, an upcoming travel screen is displayed on the screen interface 338 of the computing device 310. An upcoming travel section 376 displays data associated with an upcoming travel plan scheduled by the user. In this case, the upcoming travel section 376 includes a destination of the travel plan, a scheduled time of the travel plan, and flight information associated with a departing flight of the travel plan. In some examples, other information may also be displayed, such as hotel or other lodging information, attraction information, etc.

An associated purchase section 378 displays options, upgrades, or other potential purchases that are associated with the upcoming travel plan. For instance, a seat upgrade option and an in-flight Wi-Fi access option associated with the displayed flight to Chicago are displayed. The associated purchase section 378 may enable a user to select and purchase associated purchases displayed therein by either redeeming loyalty points of the user's loyalty profile (e.g., loyalty profile 227, etc.) or paying with other funds (e.g., a credit card associated with the user's account, etc.). The associated purchase section 378 may further provide loyalty point earning information for each displayed associated purchase when the purchase is made using the user's account.

Section 380, when selected or otherwise activated, enables the user to access other upcoming travel plans. Upon selecting another upcoming travel plan, the information displayed in section 376 and the associated purchases displayed in section 378 may be updated to display information associated with the selected upcoming travel plan. The back-button 360, when pressed or otherwise activated, causes the loyalty application to return to the main loyalty application screen (e.g., FIG. 3A, etc.).

Figure 4:
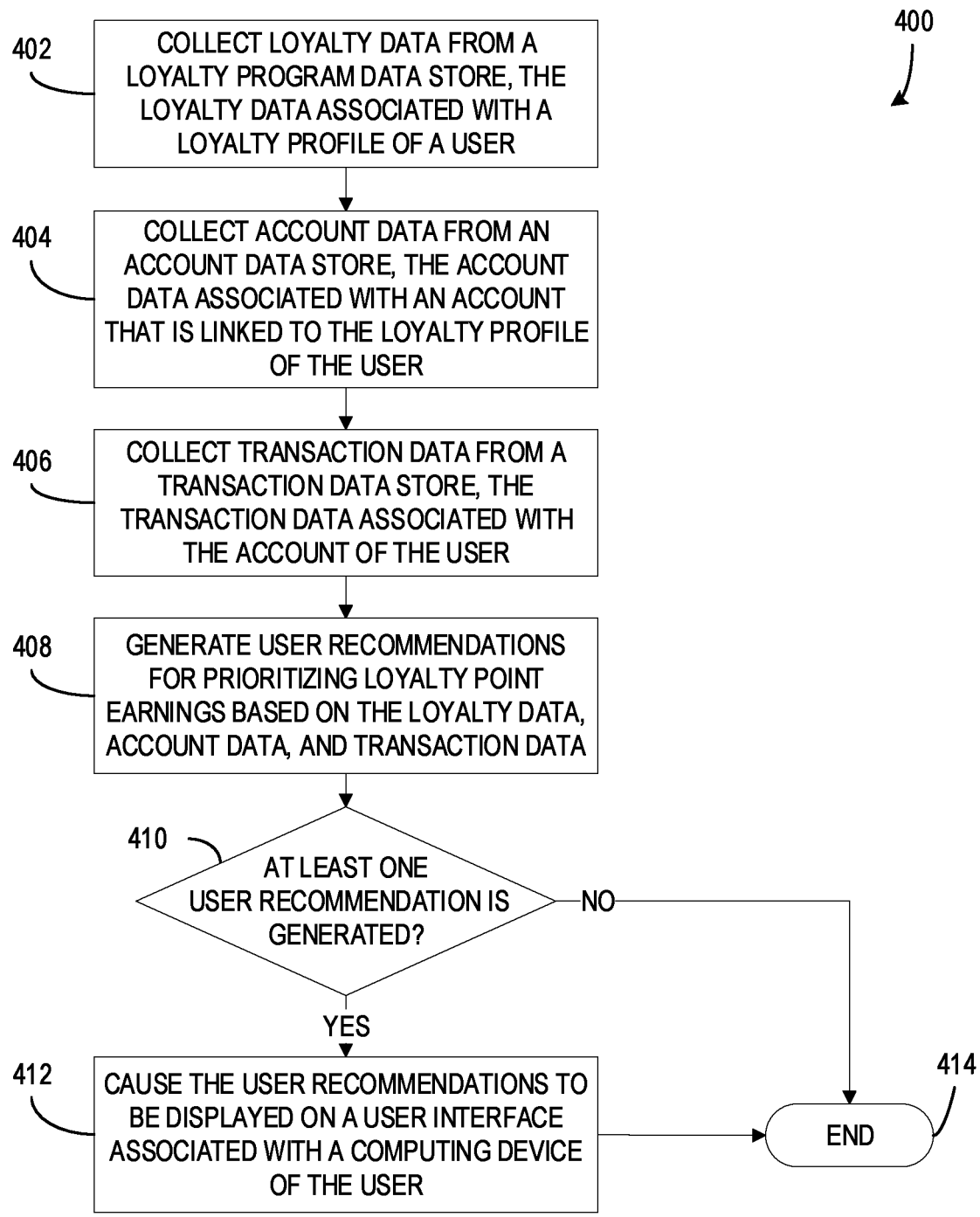
FIG. 4 is an exemplary flow chart illustrating generating recommendations for prioritizing loyalty earnings based on loyalty data, account data, and transaction data according to an embodiment.

FIG. 4 is an exemplary flow chart 400 illustrating generating recommendations for prioritizing loyalty earnings based on loyalty data, account data, and transaction data according to an embodiment. In some examples, steps 402-414 may be implemented by a loyalty management engine (e.g., loyalty management engines 114, 214, etc.) on one or more computing devices (e.g., at loyalty program provider 102, issuer 104, payment network 106, and/or computing devices 110, 210, or 310, etc.). At 402, loyalty data (e.g., loyalty data 226, etc.) is collected from a loyalty program data store (e.g. loyalty program data store 116, etc.). The collected loyalty data is associated with a user's loyalty profile (e.g., loyalty profile 227, etc.). The loyalty data may include the user's loyalty point balance, loyalty point earning rates of potential purchases, the user's travel plans associated with the loyalty program provider, etc. as described herein.

At 404, account data (e.g., account data 228, etc.) is collected from an account data store (e.g., account data store 118, etc.), the account data associated with an account that is linked to the loyalty profile of the user. Further, at 406, transaction data (e.g., transaction data 230, etc.) is collected from a transaction data store (e.g., transaction data store 120, etc.), wherein the transaction data is also associated with the account of the user.

At 408, user recommendations for prioritizing loyalty earnings are generated based on the collected loyalty data, account data, and transaction data. In some examples, the user recommendations are generated by a recommendation generator (e.g., recommendation generator 234, etc.) as described herein.

If, at 410, at least one user recommendation is generated, the generated user recommendation(s) are caused to be displayed on a user interface associated with a computing device of the user at 412. Once the recommendations are displayed to the user, the process may end at 414.

In some cases, a user recommendation is not generated based on the loyalty data, account data, and transaction data at 408. For instance, a loyalty management engine (e.g., loyalty management engine 214, etc.) may be configured to generate recommendations for the user only when a difference in the loyalty points earned on a potential recommended purchase and the loyalty points earned for a standard purchase with the account exceeds a defined threshold. For instance, if three coffee shops are identified in a user's area, but all of them provide a standard amount of loyalty points earned on purchases, the loyalty management engine may not generate a recommendation of one of the coffee shops over the others. If no user recommendation is generated at 410, the process ends at 414.

Figure 5:
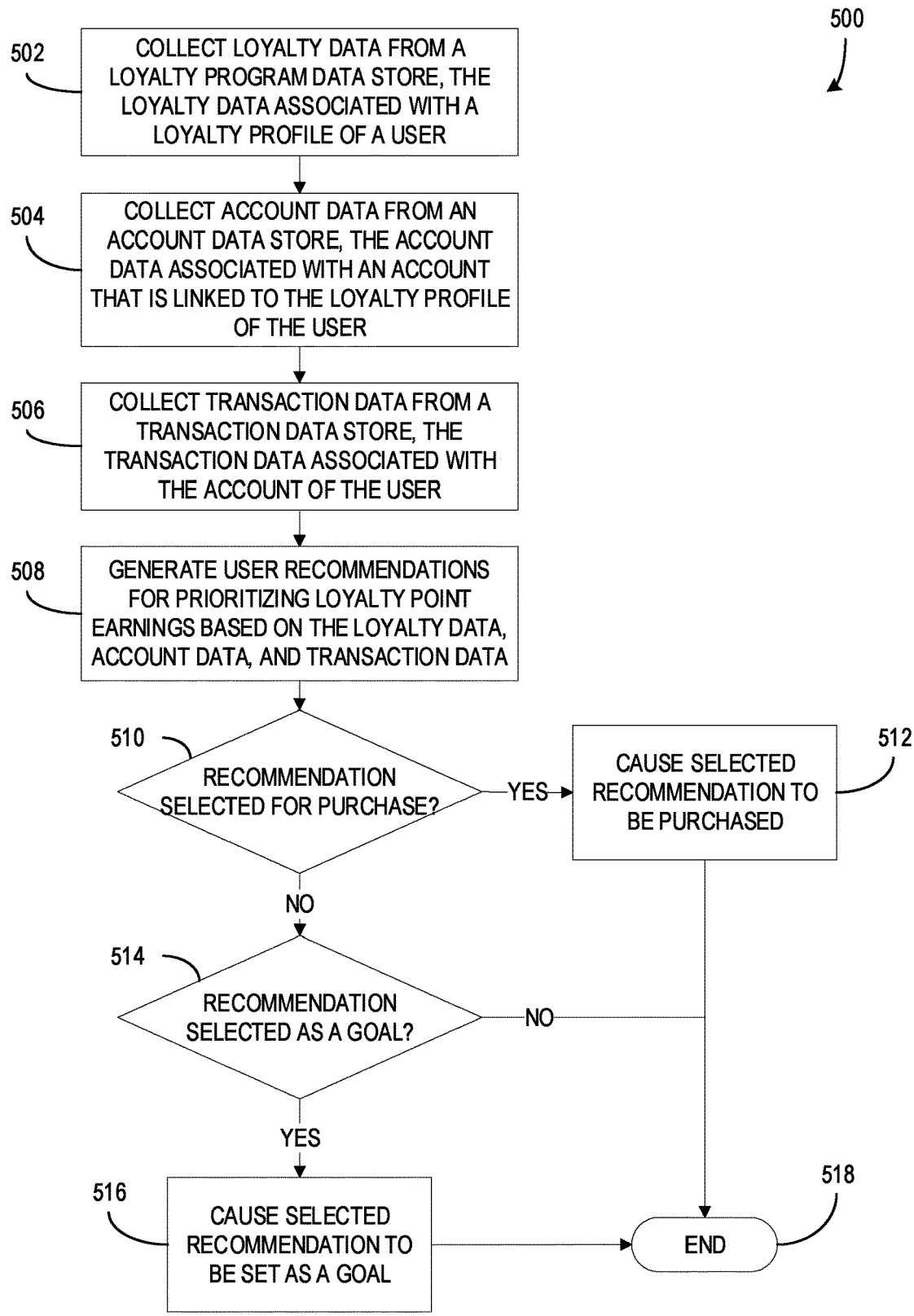
FIG. 5 is an exemplary flow chart illustrating the generation of recommendations of FIG. 4 in response to a recommendation request, wherein a recommendation is selected for purchase or as a goal by the user.

FIG. 5 is an exemplary flow chart 500 illustrating the generation of recommendations of FIG. 4 in response to a recommendation request, wherein a recommendation is selected for purchase or as a goal by the user. From 502 to 508, the loyalty data, account data, and transaction data are collected from the respective data stores and the user recommendations are generated based on the collected data as described above with respect to FIG. 4. At 510, if a recommendation of the generated recommendations is selected for purchase, the selected recommendation is purchased at 512. The user may select a recommendation for purchase by interacting with an interface (e.g., a GUI, etc.) that displays one or more generated recommendations (e.g., interface 378 of FIG. 3E, etc.). The user may further confirm the purchase of the selected recommendation, including confirming an account (e.g., an account and/or redeeming loyalty points from a loyalty profile, etc.) with which to pay for the purchase. Once the purchase of the selected recommendation is complete, the process may end at 518.

Alternatively, at 514, if a recommendation of the generated recommendations is selected as a goal, the selected recommendation is set as a goal at 516. The recommendation-based goal may be set via interaction with a goal manager (e.g., goal manager 236, etc.) of a loyalty management engine (e.g., loyalty management engine 214, etc.) as described herein. Once the recommendation has been set as a goal, the process may end at 518.

If, at 514, no recommendation has been selected for purchase or as a goal, the process may end at 518.

ADDITIONAL EXAMPLE SCENARIOS

Aspects of the disclosure enable various additional scenarios, such as next described.

In an example, a user accesses a loyalty management engine associated with Airline A to arrange a flight to Chicago. The arranged flight is associated with the user's Airline A loyalty profile and the user earns a defined amount of loyalty points based on the purchase. The user accesses the loyalty management engine to view his earned loyalty points and sees that the total has been updated to reflect the loyalty points earned due to the flight purchase.

The loyalty management engine collects the loyalty data and travel data associated with the user's arranged flight to Chicago, as well as account data and transaction data associated with the user's loyalty profile and an account associated therewith. Based on the user's transaction history and the upcoming flight to Chicago, the loyalty management engine generates three hotel recommendations for the user while the user is scheduled to be in Chicago. The brands and cost levels of the hotel recommendations are chosen by the loyalty management engine based on the user's history of staying in similar hotels of the same or similar brands. Further, each hotel of the three hotel recommendations include includes a bonus loyalty point earning rate over the standard rate for the user's Airline A loyalty profile upon reserving a room. The three hotels are displayed to the user in a priority order from largest bonus loyalty point earning rate to smallest bonus loyalty point earning rate. The user chooses to make reservations at the hotel with the highest bonus loyalty point earning rate for his Chicago trip.

Upon reserving a room in one of the three recommended hotels, the user receives a recommendation of a popular live theater show in Chicago from the loyalty management engine. The recommendation was generated by the loyalty management engine based on the user having recently purchased tickets to another live theater show during the previous three months. The recommendation includes a cost of tickets to the live theater show in redeemed loyalty points. The user sees, via his loyalty application, that he almost has enough loyalty points to purchase the tickets, so he sets the live theater show recommendation as a goal in his loyalty application. The loyalty management engine records the goal and monitors the user's earned loyalty point total to determine when the goal is met.

The user accesses the loyalty management engine via his loyalty application to request recommendations for a restaurant, including the keyword "seafood". The loyalty management engine collects loyalty data, account data, and transaction data from the loyalty program provider, issuer of the user's account, and an associated payment network respectively. The loyalty management engine also collects location context data from the user's loyalty application. The loyalty management engine identifies seafood restaurants in the region of the user's location and determines four of the restaurants offer bonus loyalty point earning rates. The four restaurants with the bonus earning rates are recommended to the user in an order that prioritizes bonus earning rates. The distance to the restaurants from the user's location is used as a secondary ordering factor. The user chooses to go to the restaurant with the second highest bonus earning rate because it is the closest to his location.

After paying for dinner using his account, the user receives a notification that he has earned enough loyalty points to be able to purchase the live theater show tickets that he had made his goal previously. The loyalty application directs the user to an interface that enables him to redeem his loyalty points to purchase two tickets to the show for an evening when he will be in Chicago. The loyalty management engine and the loyalty application update to reflect that he has spent the loyalty points on the show tickets.

Exemplary Operating Environment

Figure 6:
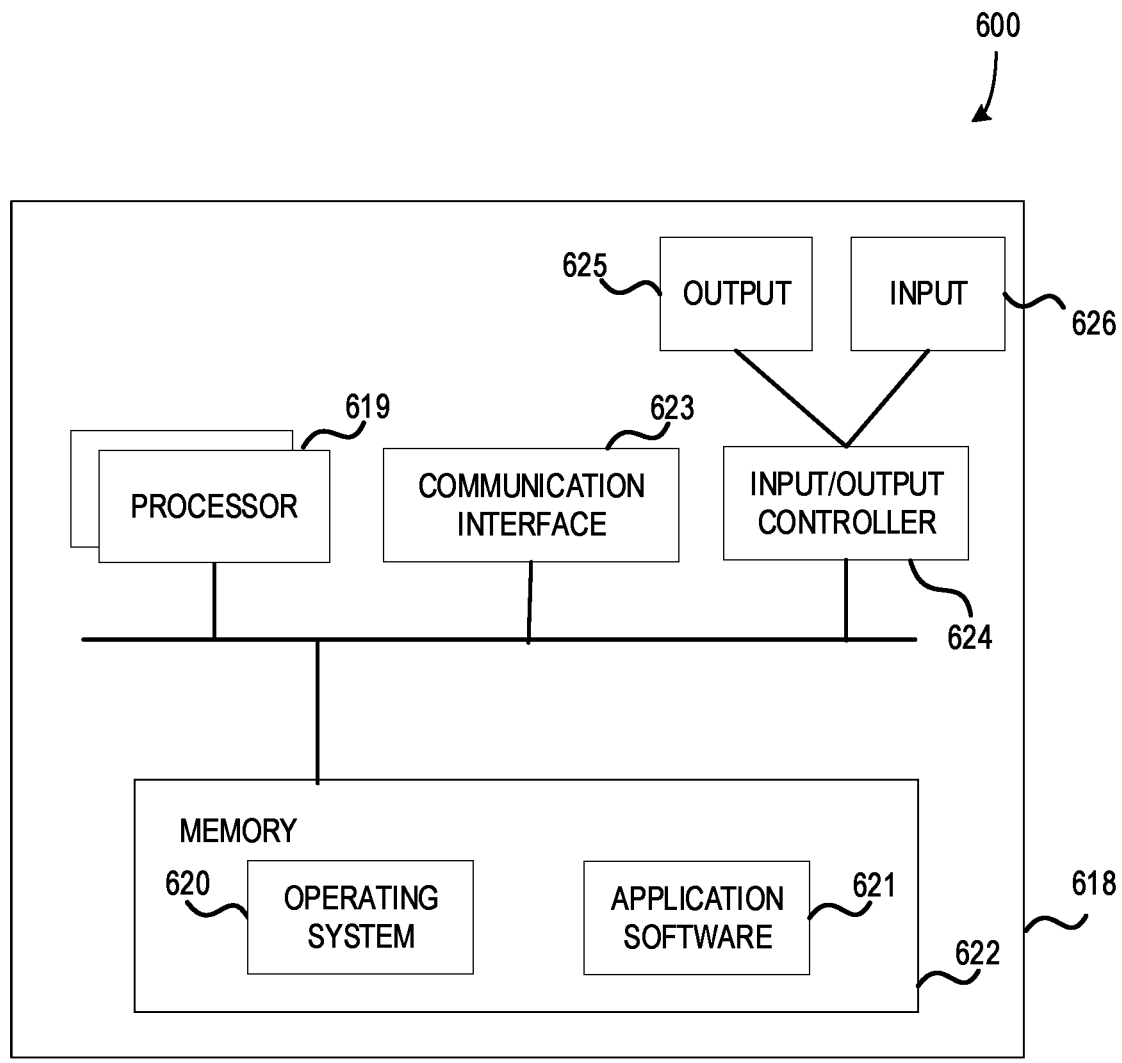
FIG. 6 illustrates a computing apparatus according to an embodiment as a functional block diagram.

The present disclosure is operable with a computing apparatus according to an embodiment as a functional block diagram 600 in FIG. 6. In an embodiment, components of a computing apparatus 618 may be implemented as a part of an electronic device according to one or more embodiments described in this specification. The computing apparatus 618 comprises one or more processors 619 which may be microprocessors, controllers or any other suitable type of processors for processing computer executable instructions to control the operation of the electronic device. Platform software comprising an operating system 620 or any other suitable platform software may be provided on the apparatus 618 to enable application software 621 to be executed on the device. According to an embodiment, collecting data related to a user's loyalty profile and associated account from multiple data sources and determining recommendations for prioritizing loyalty earnings of the user based on the collected data described herein may be accomplished by software.

Computer executable instructions may be provided using any computer-readable media that are accessible by the computing apparatus 618. Computer-readable media may include, for example, computer storage media such as a memory 622 and communications media. Computer storage media, such as a memory 622, include volatile and non-volatile, removable and non-removable media implemented in any method or technology for storage of information such as computer readable instructions, data structures, program modules or the like. Computer storage media include, but are not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 622) is shown within the computing apparatus 618, it will be appreciated by a person skilled in the art, that the storage may be distributed or located remotely and accessed via a network or other communication link (e.g. using a communication interface 623).

The computing apparatus 618 may comprise an input/output controller 624 configured to output information to one or more output devices 625, for example a display or a speaker, which may be separate from or integral to the electronic device. The input/output controller 624 may also be configured to receive and process an input from one or more input devices 626, for example, a keyboard, a microphone or a touchpad. In one embodiment, the output device 625 may also act as the input device. An example of such a device may be a touch sensitive display. The input/output controller 624 may also output data to devices other than the output device, e.g. a locally connected printing device. In some embodiments, a user may provide input to the input device(s) 626 and/or receive output from the output device(s) 625.

The functionality described herein can be performed, at least in part, by one or more hardware logic components. According to an embodiment, the computing apparatus 618 is configured by the program code when executed by the processor 619 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, etc.) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

In examples involving a general-purpose computer, aspects of the disclosure transform the general-purpose computer into a special-purpose computing device when configured to execute the instructions described herein.

Alternatively, or in addition to the other examples described herein, examples include any combination of the following:

A system for generating purchase recommendations to maximize loyalty earnings, the system comprising:
at least one processor;
at least one memory comprising computer program code, the at least one memory and computer program code configured to, with the at least one processor, cause the at least one processor to:

collect, by a loyalty management engine, loyalty data from a loyalty program data store, the loyalty data associated with a loyalty profile of a user;
collect, by the loyalty management engine, account data from an account data store, the account data associated with an account of the user that is linked to the loyalty profile of the user;
collect, by the loyalty management engine, transaction data from a transaction data store, the transaction data associated with the account of the user;
generate, by the loyalty management engine, user recommendations for prioritizing loyalty point earnings on the loyalty profile based on the loyalty data, account data, and transaction data; and
cause the user recommendations to be displayed on a user interface associated with a computing device of the user.

The system described above, wherein the loyalty profile includes at least one loyalty goal; and
generating user recommendations for prioritizing loyalty earnings on the loyalty profile is further based on the at least one loyalty goal of the loyalty profile.

The system described above, wherein the at least one loyalty goal includes at least one of a loyalty goal of a defined loyalty point amount and a loyalty goal of a defined loyalty reward.

The system described above, the at least one memory and computer program code configured to, with the at least one processor, further cause the at least one processor to:
receive, by the loyalty management engine, a recommendation request, the recommendation request including at least one recommendation category; and
wherein generating user recommendations for prioritizing loyalty earnings on the loyalty profile is further based on the at least one recommendation category of the recommendation request.

The system described above, wherein the collected loyalty data includes travel plan data associated with a travel plan of the user; and
generating user recommendations for prioritizing loyalty earnings on the loyalty profile is further based on the travel plan data.

The system described above, wherein the travel plan data includes at least one location and at least one time period of the travel plan of the user and the generated recommendations are associated with the at least one location and the at least one time period.

The system described above, wherein the generated user recommendations based on the travel plan data include at least one of a flight upgrade of a flight of the travel plan, network access on a flight of the travel plan, or a hotel upgrade of a hotel of the travel plan.

The system described above, the at least one memory and computer program code configured to, with the at least one processor, further cause the at least one processor to:
collect, by the loyalty management engine, context data associated with a current datetime and a current location of the user; and
wherein generating user recommendations for prioritizing loyalty earnings on the loyalty profile is further based on the context data.

The system described above, the at least one memory and computer program code configured to, with the at least one processor, further cause the at least one processor to:
identify, by the loyalty management engine, behavior patterns of the user based on the loyalty data, account data, and transaction data; and wherein generating user recommendations for prioritizing loyalty earnings on the loyalty profile is further based on the identified behavior patterns.

The system described above, wherein the user recommendations include at least one of recommendations for earning loyalty points and recommendations for spending loyalty points.

A computerized method for generating purchase recommendations to maximize loyalty earnings, the method comprising:

collecting, by a loyalty management engine, loyalty data from a loyalty program data store, the loyalty data associated with a loyalty profile of a user;

collecting, by the loyalty management engine, account data from an account data store, the account data associated with an account of the user that is linked to the loyalty profile of the user;

collecting, by the loyalty management engine, transaction data from a transaction data store, the transaction data associated with the account of the user;

generating, by the loyalty management engine, user recommendations for prioritizing loyalty point earnings on the loyalty profile based on the loyalty data, account data, and transaction data; and causing, by the loyalty management engine, the user recommendations to be displayed on a user interface associated with a computing device of the user.

The computerized method described above, wherein the loyalty profile includes at least one loyalty goal; and generating user recommendations for prioritizing loyalty earnings on the loyalty profile is further based on the at least one loyalty goal of the loyalty profile.

The computerized method described above, wherein the at least one loyalty goal includes at least one of a loyalty goal of a defined loyalty point amount and a loyalty goal of a defined loyalty reward.

The computerized method described above, further comprising:

receiving, by the loyalty management engine, a recommendation request, the recommendation request including at least one recommendation category; and wherein generating user recommendations for prioritizing loyalty earnings on the loyalty profile is further based on the at least one recommendation category of the recommendation request.

The computerized method described above, wherein the collected loyalty data includes travel plan data associated with a travel plan of the user; and generating user recommendations for prioritizing loyalty earnings on the loyalty profile is further based on the travel plan data.

The computerized method described above, wherein the travel plan data includes at least one location and at least one time period of the travel plan of the user and the generated recommendations are associated with the at least one location and the at least one time period.

The computerized method described above, wherein the generated user recommendations based on the travel plan data include at least one of a flight upgrade of a flight of the travel plan, network access on a flight of the travel plan, or a hotel upgrade of a hotel of the travel plan.

One or more computer storage media having computer-executable instructions for generating purchase recommendations to maximize loyalty earnings that, upon execution by a processor, cause the processor to at least:

collect, by a loyalty management engine, loyalty data from a loyalty program data store, the loyalty data associated with a loyalty profile of a user;

collect, by the loyalty management engine, account data from an account data store, the account data associated with an account of the user that is linked to the loyalty profile of the user;

collect, by the loyalty management engine, transaction data from a transaction data store, the transaction data associated with the account of the user;

generate, by the loyalty management engine, user recommendations for prioritizing loyalty point earnings on the loyalty profile based on the loyalty data, account data, and transaction data; and cause, by the loyalty management engine, the user recommendations to be displayed on a user interface associated with a computing device of the user.

The one or more computer storage media described above, the computer-executable instructions, upon execution by the processor, further cause the processor to:

collect, by the loyalty management engine, context data associated with a current datetime and a current location of the user; and wherein generating user recommendations for prioritizing loyalty earnings on the loyalty profile is further based on the context data.

The one or more computer storage media described above, the computer-executable instructions, upon execution by the processor, further cause the processor to:

identify, by the loyalty management engine, behavior patterns of the user based on the loyalty data, account data, and transaction data; and wherein generating user recommendations for prioritizing loyalty earnings on the loyalty profile is further based on the identified behavior patterns.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but within the scope of aspects of the claims constitute exemplary means for collecting data related to a user's loyalty profile and associated account from multiple data sources and determining and displaying recommendations for prioritizing loyalty earnings of the user based on the collected data. This includes means for collecting loyalty data from a loyalty program data store, the loyalty data associated with a loyalty profile of a user; means for collecting account data from an account data store, the account data associated with an account of the user that is linked to the loyalty profile of the user; means for collecting transaction data from a transaction data store, the transaction data associated with the account of the user; means for generating user recommendations for prioritizing loyalty point earnings on the loyalty profile based on the loyalty data, account data, and transaction data; and means for causing the user recommendations to be displayed on a user interface associated with a computing device of the user. The illustrated one or more processors 619 together with the computer program code stored in memory 622 constitute exemplary processing means for identifying possible merchants and/or purchases, determining potential loyalty earnings of the identified merchants and/or purchases, and recommending at least a portion of the identified merchants and/or purchases based on the determined potential loyalty earnings.

The term "comprising" is used in this specification to mean including the feature(s) or act(s) followed thereafter, without excluding the presence of one or more additional features or acts.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for generating purchase recommendations to maximize loyalty earnings, the system comprising:
    at least one processor;
    at least one memory comprising computer program code, the at least one memory and computer program code configured to, with the at least one processor, cause the at least one processor to:
        collect, by a server executing a loyalty management engine, loyalty data from a loyalty program data store maintained by a loyalty program provider server, the loyalty data associated with a loyalty profile of a user;
        collect, by the server executing the loyalty management engine, account data from an account data store maintained by an issuer server, the account data associated with an account of the user that is linked to the loyalty profile of the user;
        collect, by the server executing the loyalty management engine, transaction data from a transaction data store maintained by a payment processing server, the transaction data associated with the account of the user;
        collect, by the server executing the loyalty management engine, user context data, including user global positioning system (GPS) location data and user preference data from a computing device of the user;
        analyze, by the loyalty management engine based on recommendation rules, the loyalty data, the account data, the transaction data, and the user context data, the loyalty data including loyalty points to be earned, based on a co-branding agreement, at merchants associated with a loyalty program and loyalty points to be earned at other merchants, a rate of the loyalty points to be earned at the merchants associated with the loyalty program being greater than a rate of loyalty points to be earned at the other merchants;
        generate, by the loyalty management engine based on the analysis, user recommendations for maximizing loyalty point earnings for a potential purchase of one or more items at one or more merchants; and
        transmit, by the loyalty management engine via a network, the user recommendations to the computing device of the user for display, the user recommendations including a list of merchants at which purchase of the one or more items may be completed, the list being ordered based on amounts of loyalty points to be earned from the purchase.

2. The system of claim 1, wherein the loyalty profile includes at least one loyalty goal, the loyalty goal comprising a quantity of accumulated loyalty points that, when redeemed, result in purchase of a good or service.

3. The system of claim 1, wherein the user recommendations are generated for the potential purchase based on a difference in the loyalty points earned based on the co-branding agreement and loyalty points earned at the other merchants exceeding a threshold value.

4. The system of claim 1, the at least one memory and computer program code configured to, with the at least one processor, further cause the at least one processor to:
    receive, by the loyalty management engine, a recommendation request, the recommendation request including at least one recommendation category; and
    wherein generating user recommendations for maximizing loyalty point earnings for the potential purchase is further based on the at least one recommendation category.

5. The system of claim 1, wherein the user context data includes a time during which a loyalty point earning bonus is offered, and wherein transmitting the user recommendations to the computing device for display includes causing the time to be displayed on a user interface.

6. The system of claim 1, wherein a travel plan data associated with a travel plan of the user includes at least one location and at least one time period of the travel plan and the generated user recommendations are associated with the at least one location and the at least one time period.

7. The system of claim 1, wherein the analyzing includes determining, based on a transaction behavior pattern of the user, a type of merchant that the user has frequented, and wherein generating the user recommendations includes identifying, based on the GPS location data of the user, at least one merchant of the determined type.

8. The system of claim 2, the at least one memory and computer program code configured to, with the at least one processor, further cause the at least one processor to:
send a notification to the user when a quantity of earned loyalty points meets or exceeds the at least one loyalty goal.

9. The system of claim 1, wherein the user context data includes one or more keywords provided by the user and the at least one memory and computer program code configured to, with the at least one processor, further cause the at least one processor to:
cause the displayed user recommendations to include a list of merchants filtered based on the provided one or more keywords, the list being ordered based on the rate of the loyalty points to be earned.

10. The system of claim 1, wherein the displayed user recommendations include one or more purchase locations that maximize loyalty point earnings.

11. A computerized method for generating purchase recommendations to maximize loyalty earnings, the method comprising:
collecting, by a server executing a loyalty management engine, loyalty data from a loyalty program data store maintained by a loyalty program provider server, the loyalty data associated with a loyalty profile of a user;
collecting, by the server executing the loyalty management engine, account data from an account data store maintained by an issuer server, the account data associated with an account of the user that is linked to the loyalty profile of the user;
collecting, by the server executing the loyalty management engine, transaction data from a transaction data store maintained by a payment processing server, the transaction data associated with the account of the user;
collecting, by the server executing the loyalty management engine, user context data, including user global positioning system (GPS) location data and user preference data from a computing device of the user;
analyzing, by the loyalty management engine based on recommendation rules, the loyalty data, the account data, the transaction data, and the user context data, the loyalty data including loyalty points to be earned, based on a co-branding agreement, at merchants associated with a loyalty program and loyalty points to be earned at other merchants, a rate of the loyalty points to be earned at the merchants associated with the loyalty program being greater than a rate of loyalty points to be earned at the other merchants;
generating, by the loyalty management engine based on the analysis, user recommendations for maximizing loyalty point earnings for a potential purchase of one or more items at one or more merchants; and
transmitting, by the loyalty management engine, via a network, the user recommendations to the computing device of the user for display, the user recommendations including a list of merchants at which purchase of the one or more items may be completed, the list being ordered based on amounts of loyalty points to be earned from the purchase.

12. The computerized method of claim 11, wherein the analyzing includes determining, based on a transaction behavior pattern of the user, a type of merchant that the user has frequented, and wherein generating the user recommendations includes identifying, based on the GPS location data of the user, at least one merchant of the determined type.

13. The computerized method of claim 11, wherein the user recommendations are generated for the potential purchase based on a difference in the loyalty points to be earned based on the co-branding agreement and the loyalty points to be earned at the other merchants exceeding a threshold value.

14. The computerized method of claim 11, wherein the user context data includes one or more keywords provided by the user, and further comprising:
causing the user recommendations to include a list of merchants filtered based on the provided one or more keywords, the list being ordered based on the rate of the loyalty points to be earned.

15. The computerized method of claim 11, wherein the user recommendations include one or more purchase locations that maximize the loyalty point earnings.

16. The computerized method of claim 11, further comprising:
setting a loyalty goal comprising a quantity of accumulated loyalty points that, when redeemed, result in purchase of a good or service; and
sending a notification to the user when a quantity of earned loyalty points meets or exceeds the loyalty goal.

17. The computerized method of claim 11, wherein the loyalty profile includes at least one loyalty goal, the at least one loyalty goal comprising a quantity of accumulated loyalty points that, when redeemed, result in purchase of a good or service.

18. One or more computer storage media having computer-executable instructions for generating purchase recommendations to maximize loyalty earnings that, upon execution by a processor, cause the processor to at least:
collect, by a server executing a loyalty management engine, loyalty data from a loyalty program data store maintained by a loyalty program provider, the loyalty data associated with a loyalty profile of a user;
collect, by the server executing the loyalty management engine, account data from an account data store maintained by an issuer server, the account data associated with an account of the user that is linked to the loyalty profile of the user;
collect, by the server executing the loyalty management engine, transaction data from a transaction data store maintained by a payment processing server, the transaction data associated with the account of the user;
collect, by the server executing the loyalty management engine, user context data, including user global positioning system (GPS) location data and user preference data from a computing device of the user;
analyze, by the loyalty management engine based on recommendation rules, the loyalty data, the account data, the transaction data, and the user context data, the loyalty data including loyalty points to be earned, based on a co-branding agreement, at merchants associated with a loyalty program and loyalty points to be earned at other merchants, a rate of the loyalty points to be earned at the merchants associated with the loyalty program being greater than a rate of loyalty points to be earned at the other merchants;
generate, by the loyalty management engine based on the analysis, user recommendations for maximizing loyalty point earnings for a potential purchase of one or more items at one or more merchants; and
transmit, by the loyalty management engine, via a network, the user recommendations to the computing device of the user for display, the user recommendations including a list of merchants at which purchase of the one or more items may be completed, the list being ordered based on amounts of loyalty points to be earned from the purchase.

19. The one or more computer storage media of claim 18, wherein the analyzing includes determining, based on a transaction behavior pattern of the user, a type of merchant that the user has frequented, and wherein generating the user recommendations includes identifying, based on the GPS location data of the user, at least one merchant of the determined type.

20. The one or more computer storage media of claim 18, wherein the user context data includes one or more keywords provided by the user and the computer-executable instructions, upon execution by the processor, further cause the processor to:
   cause the user recommendations to include a list of merchants filtered based on the provided one or more keywords, the list being ordered based on the rate of the loyalty points to be earned.

\* \* \* \* \*